(12) United States Patent
Le et al.

(10) Patent No.: US 6,721,874 B1
(45) Date of Patent: Apr. 13, 2004

(54) METHOD AND SYSTEM FOR DYNAMICALLY SHARED COMPLETION TABLE SUPPORTING MULTIPLE THREADS IN A PROCESSING SYSTEM

(75) Inventors: Hung Qui Le, Austin, TX (US); Peichun Liu, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 09/687,078

(22) Filed: Oct. 12, 2000

(51) Int. Cl.[7] .................................................. G06F 9/38
(52) U.S. Cl. ...................................... 712/218; 712/244
(58) Field of Search ................................. 712/218, 244

(56) References Cited

U.S. PATENT DOCUMENTS

| | | | |
|---|---|---|---|
| 6,192,461 B1 * | 2/2001 | Williamson et al. | 712/23 |
| 6,314,471 B1 * | 11/2001 | Alverson et al. | 710/5 |
| 6,363,410 B1 * | 3/2002 | Kanamori et al. | 709/104 |
| 6,496,925 B1 * | 12/2002 | Rodgers et al. | 712/244 |
| 6,553,480 B1 * | 4/2003 | Cheong et al. | 712/23 |

* cited by examiner

*Primary Examiner*—William M. Treat
(74) *Attorney, Agent, or Firm*—Sawyer & Associates; Casimer K. Salys

(57) ABSTRACT

A method and system for utilizing a completion table in a superscalar processor is disclosed. The method and system comprises providing a plurality of threads to the processor and associating a link list with each of the threads, wherein each entry associated with a thread is linked to a next entry. A method and system in accordance with the present invention implements the completion table as link lists. Each entry in the completion table in a thread is linked to the next entry via a pointer that is stored in a link list. In a second aspect a method of determining the relative order between instructions is provided. A method and system in accordance with the present invention implements a flush mask array which is accessed to determine the relative order of entries in the said completion table. A method and system in accordance with the present invention implements a restore head pointer table to save and restore the state of the pointer of said completion table.

23 Claims, 6 Drawing Sheets

```
                38                          38                            38
                 |                           |                             |
           ---------------              ---------------              ---------------
    tail0 0 | G0  T0   |        tail0 0 | G0  T0   |       head,tail0 0 | G0  T0   |
           ---------------              ---------------              ---------------
          1 | G0  T1   |              1 |          |                    1 |          |
           ---------------              ---------------              ---------------
          2 | G1  T0   |              2 | G1  T0   |                    2 | G1  T0   |
           ---------------              ---------------              ---------------
          3 | G1  T1   |              3 |          |                    3 |          |
           ---------------              ---------------              ---------------
          4 | G2  T0   |              4 | G2  T0   |                    4 | G2  T0   |
           ---------------              ---------------              ---------------
    tail1 5 | G2  T1   |        tail1 5 | G2  T1   |              tail1 5 | G2  T1   |
           ---------------              ---------------              ---------------
    head  6 |          |        head  6 |          |                    6 | G3  T0   |
           ---------------              ---------------              ---------------
          7 |          |              7 |          |                    7 | G3  T1   |
           ---------------              ---------------              ---------------
        ...|          |            ...|          |                  ...| Gx  T0   |
           ---------------              ---------------              ---------------
        n-2|          |            n-2|          |                  n-2| Gx  T0   |
           ---------------              ---------------              ---------------
        n-1|          |            n-1|          |                  n-1| Gx  T1   |
           ---------------              ---------------              ---------------
             Figure 2A                    Figure 2B                    Figure 2C 38
                 |
           ---------------
    tail0 0 | G0  T0   |
           ---------------
          1 |          |
           ---------------
          2 | G1  T0   |
           ---------------
          3 |          |
           ---------------
          4 | G2  T0   |
           ---------------
          5 |          |
           ---------------
          6 | G3  T0   |
           ---------------
          7 |          |
           ---------------
        ...| Gx  T0   |
           ---------------
        n-2| Gx  T0   |
           ---------------
head,tail1 n-1|          |
           ---------------
             Figure 2D
```

METHOD AND SYSTEM FOR DYNAMICALLY SHARED COMPLETION TABLE SUPPORTING MULTIPLE THREADS IN A PROCESSING SYSTEM

FIELD OF THE INVENTION

The present invention relates generally to data processing and, in particular, to processors that support out of order instruction execution. Still more particularly, the present invention relates to a system and method for processing multiple threads in a processing system.

BACKGROUND OF THE INVENTION

The evolution of microprocessors has reached the point where architectural concepts pioneered in vector processors and mainframe computers of the 1970s, such as the CDC-6600 and Cray-1, are appearing in Reduced Instruction Sets Computing (RISC) processors. Early RISC machines were very simple single-chip processors. As Very Large Scale Integrated (VLSI) technology improves, more additional space becomes available on a semiconductor chip. Rather than increase the complexity of a processor architecture, most designers have decided to use the additional space to supplement techniques to improve the execution of their current processor architecture. Two principal techniques utilized are on-chip caches and instruction pipelines.

A next step in this evolutionary process is the superscalar processor. The name implies that these processors are scalar processors that are capable of executing more than one instruction in each cycle. The elements to superscalar execution are an instruction fetching unit that can fetch more than one instruction at a time from a cache memory; instruction decoding logic that can decide when instructions are independent and thus can be executed and sufficient execution units to be able to process several instructions at one time. It should be noted that the execution units may be pipelined, e.g., they may be floating point adders or multipliers, in which case, the cycle time for each stage matches the cycle times for the fetching and decoding logic. In many systems, the high level architecture has remained unchanged from earlier scalar designs. The superscalar processor designs typically use instruction level parallelism for improved implementations of these architectures.

Within a superscalar processor, instructions are first fetched, decoded and then buffered. Instructions can be dispatched to executions units out of program order as resources and operands become available. Additionally, instructions can be fetched and dispatched speculatively based on predictions about branches taken. The result is a pool of instructions in varying stages of execution, none of which have been completed by writing final results. As resources become available and branches are resolved, instructions are "retired" in program order. This preserves the appearance of a machine that executes the instructions in program order.

A superscalar processor tracks, or manages, instructions that have been speculatively executed typically utilizing a completion buffer. Each executed instruction in the buffer is associated with its results, which are generally stored in rename registers, and any exception flags. A retire unit removes these executed instructions from the buffer typically in program order. The retire unit then updates designated registers with the computed results from the rename registers.

The conventional completion table in a superscalar microprocessor is implemented as an in-order FIFO queue supporting one stream of instructions. In an in-order FIFO queue implementation, an entry in the completion table is allocated at dispatch time and is removed the instruction in that entry completes. Dispatch and completion occurs in order. The relative order of the instruction can be deduced by looking at the completion table entry number (GTAG) that the instruction is allocated.

In a Simultaneous Multithreading environment, multiple independent instruction streams (threads) are dispatched, executed, completed concurrently. Since instructions from each thread are dispatched and completed independently from instruction from other threads, the completion table can not be implemented efficiently as an in-order FIFO.

Accordingly, what is needed in the art is an improved processor architecture that mitigates the above-described limitations. The present invention addresses such a need.

SUMMARY OF THE INVENTION

A method and system for utilizing a completion table in a superscalar processor is disclosed. The method and system comprises providing a plurality of threads to the processor and associating a link list with each of the threads, wherein each entry associated with a thread is linked to a next entry. A method and system in accordance with the present invention implements the completion table as link lists. Each entry in the completion table in a thread is linked to the next entry via a pointer that is stored in a link list.

In a second aspect a method of determining the relative order between instructions is provided. A method and system in accordance with the present invention implements a flush mask array which is accessed to determine the relative order of entries in the said completion table. A method and system in accordance with the present invention implements a restore head pointer table to save and restore the state of the pointer of said completion table.

DESCRIPTION OF THE DRAWINGS

FIGS. 2A–2D show the contents of a conventional global completion table at various stages.

DETAILED DESCRIPTION

The present invention relates generally to data processing and, in particular, to processors that support out of order instruction execution. Still more particularly, the present invention relates to a system and method for processing multiple threads in a processing system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system for utilizing a completion table in a superscalar processor is disclosed. The method and system comprises providing a plurality of threads to the processor and associating a link list with each of the threads, wherein each entry associated with a thread is linked to a next entry. A method and system in accordance with the present invention implements the completion table as link lists. Each entry in the completion table in a thread is linked to the next entry via a pointer that is stored in a link list.

In a second aspect a method of determining the relative order between instructions is provided. The determination is necessary when an exception condition occurs in the processor requiring groups of instructions to be flushed that are no longer valid.

In this determination each execution unit reports the exception condition by sending a GTAG associated with the group that needs to be flushed to a completion function. The completion function must then determine the oldest group that needs to be flushed, generate the necessary flush mask, and restore the head pointer of the completion table to the appropriate entry. The flush mask in a preferred embodiment is a vector of bits which corresponds to the groups that need be discarded. The completion function broadcasts the flush mask to all execution units so that each unit can discard the flushed instructions.

Figure 1:
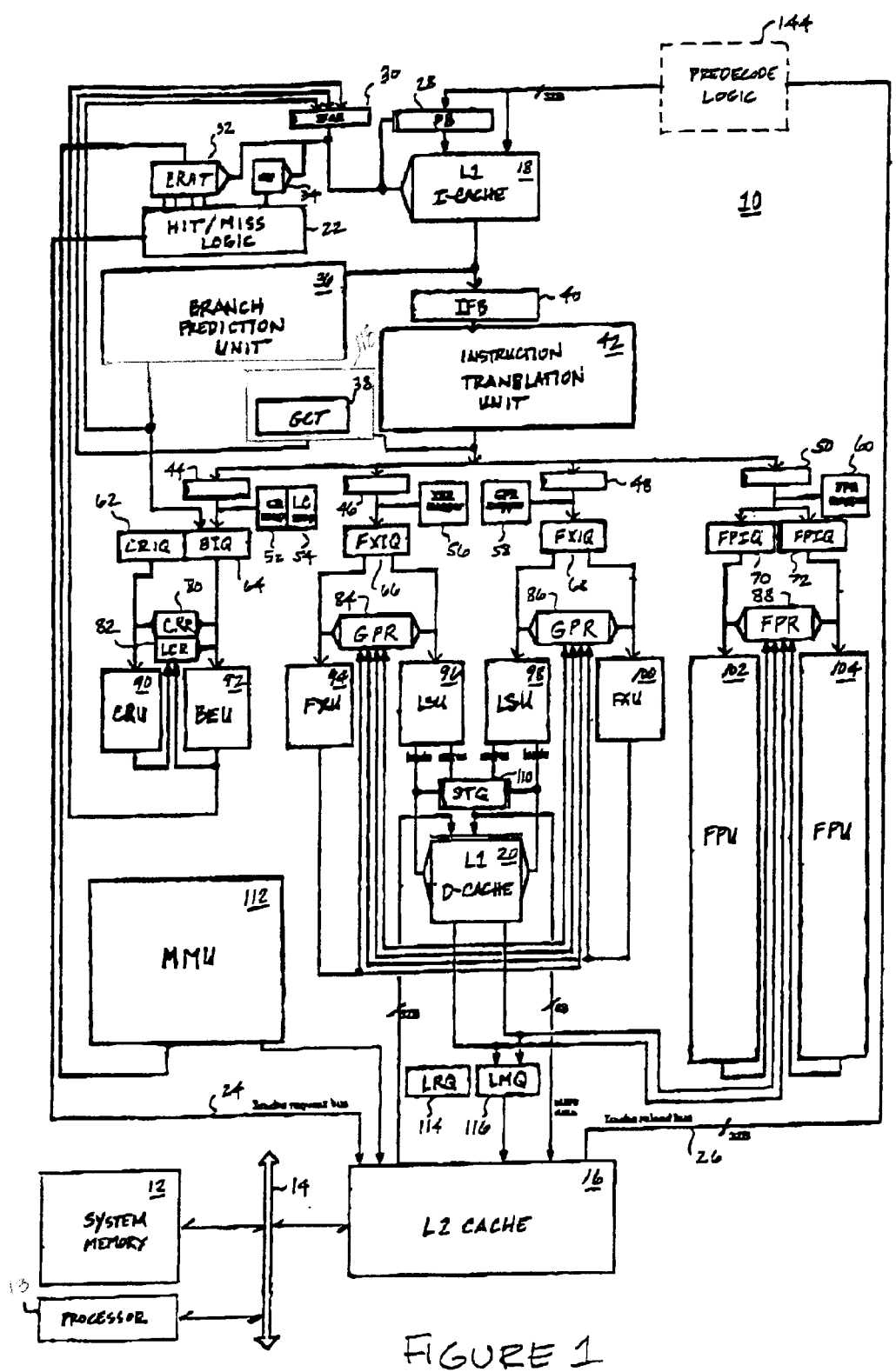
FIG. 1 illustrates a high-level block diagram of an illustrative embodiment of a processor for processing instructions and data in accordance with the present invention.

With reference now to the figures and in particular with reference to FIG. 1, there is depicted a high level block diagram of an illustrative embodiment of a processor, generally designated 10, for processing instructions and data in accordance with the present invention. Processor 10 comprises a single integrated circuit superscalar processor, which, as discussed further below, includes various execution units, registers, buffers, memories, and other functional units that are all formed by integrated circuitry. As illustrated in FIG. 1, processor 10 may be coupled to other devices, such as a system memory 12 and a second processor 13, by an interconnect fabric 14 to form a larger data processing system such as computer system.

Processor 10 has an on-chip multi-level cache hierarchy including a unified level two (L2) cache 16 and bifurcated level one (L1) instruction (I) and data (D) caches 18 and 20, respectively. As is well known to those skilled in the art, caches 16, 18 and 20 provide low latency access to cache lines corresponding to memory locations in system memory 12.

Instructions are fetched for processing from L1 I-cache 18 in response to the effective address (EA) residing in instruction fetch address register (IFAR) 30. During each cycle, a new instruction fetch address may be loaded into IFAR 30 from one of three sources: branch prediction unit (BPU) 36, which provides speculative path addresses resulting from the prediction of conditional branch instructions, group completion table (GCT) 38, in completion unit (CU) 118 which provides non-speculative path addresses, and branch execution unit (BEU) 92, which provides non-speculative addresses resulting from the resolution of incorrectly predicted conditional branch instructions. If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 based upon recent access patterns. In response to a request address, L2 cache 16 outputs a cache line of instructions, which are loaded into prefetch buffer (PB) 28 and L1 I-cache reload bus 26, possibly after passing through optional predecode logic 144.

Once the cache line specified by the EA in IFAR 30 resides in L1 cache 18, L1 I-cache 18 outputs the cache line to both branch prediction unit (BPU) 36 and to instruction fetch buffer (IFB) 40. BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by group completion table 38 to an instruction group, the members of which are permitted to be dispatched and executed out-of-order with respect to one another. Group completion table 38 tracks each instruction group for which execution has yet to be completed by at least one associated EA, which is preferably the EA of the oldest instruction in the instruction group.

Following UISA-to-IISA instruction translation, instructions are dispatched to one of latches 44, 46, 48 and 50, possibly out-of-order, based upon instruction types. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more rename registers by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically to the execution units of processor 10 for execution as long as data dependencies and antidependencies are observed. The instructions, however, are maintained in issue queues 62–72 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90–104 is preferably implemented as an execution pipeline having a number of pipeline stages.

During execution within one of execution units 90–104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution unit writes the result to the designated destination as specified by the instruction, removes the instruction from the issue queue, notifies CU 118, which schedules completion of instructions in program order. To complete an instruction executed by one of CRU 90, FXUs 94 and 100 or FPUs 102 and 104, CU 118 signals the execution unit, which writes back the result data, if any, from the assigned rename register(s) to one or more architected registers within the appropriate register file. Once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by BPU 36. If the path addresses match, no further processing is required. If, however, the calculated path address does not match the predicted path address, BEU 92 supplies the correct path address to IFAR 30. In either event, the branch instruction can then be removed from BIQ 64, and when all other instructions within the same instruction group have completed, from GCT 38.

Following execution of a load instruction, the effective address computed by executing the load instruction is translated to a real address by a data ERAT (not illustrated) and then provided to L1 D-cache 20 as a request address. At this point, the load instruction is removed from FXIQ 66 or 68 and placed in load reorder queue (LRQ) 114 until the indicated load is performed. If the request address misses in L1 D-cache 20, the request address is placed in load miss queue (LMQ) 116, from which the requested data is retrieved from L2 cache 16, and failing that, from another processor 13 or from system memory 12. LRQ 114 snoops exclusive access requests (e.g., read-with-intent-to-modify), flushes or kills on interconnect fabric 14 against loads in flight, and if a hit occurs, cancels and reissues the load instruction.

Store instructions are similarly completed utilizing a store queue (STQ) 110 into which effective addresses for stores are loaded following execution of the store instructions. From STQ 110, data can be stored into either or both of L1 D-cache 20 and L2 cache 16.

As before-mentioned, a group completion table 38 tracks each instruction group for which execution has yet to be completed by at least one associated EA, which is preferably the EA of the oldest instruction in the instruction group. The GCT 38 is typically implemented in the processor 10 as a FIFO queue. However, when multiple programs or threads are run on the processor 10 inefficiencies occur if a FIFO queue is utilized.

To describe the problems associated with utilizing a FIFO queue refer now to FIGS. 2A–2D and the accompanying description. FIGS. 2A–2D illustrate the contents of GCT 38 implemented as a FIFO for 2 threads at various stages of completion. The head is the allocated pointer which points to the next empty entry in GCT 38 to receive a dispatched group of instructions from the Instruction Translation Unit (not shown). Tail0 is the completion pointer which points to the entry that contains the oldest group instructions belonging to thread0 that is to be completed next if all instructions in that group have executed. Likewise tail1 is the completion pointer which points to the entry that contains the oldest group instructions belonging to thread1 that is to be completed next if all instructions in that group have executed.

FIG. 2A shows the contents of GCT 38 which illustrates group 0 of thread0 (G0 T0) at entry 0 is the next to be completed; the subsequent groups of the first thread (thread 0) are group 1 (G1 T0) at location 2 and group 2 (G2 T0) at location 4. For the second thread (thread 1) the groups of which the dispatch order from oldest to youngest are group 0 at location 1, group 1 at location 3, and group 2 at location 5. FIG. 2B shows the contents of GCT 38 after two groups of instructions in thread 1, group 0 and 1, have completed. GCT entry 1 and 3 become empty. FIG. 2C shows the contents of GCT 38 after more group of instruction from either of the threads have been dispatched. The head pointer points to the same location as tail0 which contains a valid group. Dispatch is stopped since the head pointer may not move past any tail pointer. In effect GCT 38 appears as if is full even if there are 2 empty entries.

Furthermore, FIG. 2D illustrates the state of GCT 38 if at this time an exception condition requires all instructions that belong to thread 1 are to be discarded. Since the head pointer points to the next empty location after a valid entry, the head points to entry n−1. This means that GCT 38 appears as if it has only 1 empty entry while in fact it has more empty entries than that.

Accordingly, when a FIFO in the GCT 38 is implemented as a FIFO queue it may appear to be full and therefore cannot execute any new instructions when in fact there are empty entries. This significantly affects the performance of the processor.

Figure 3:
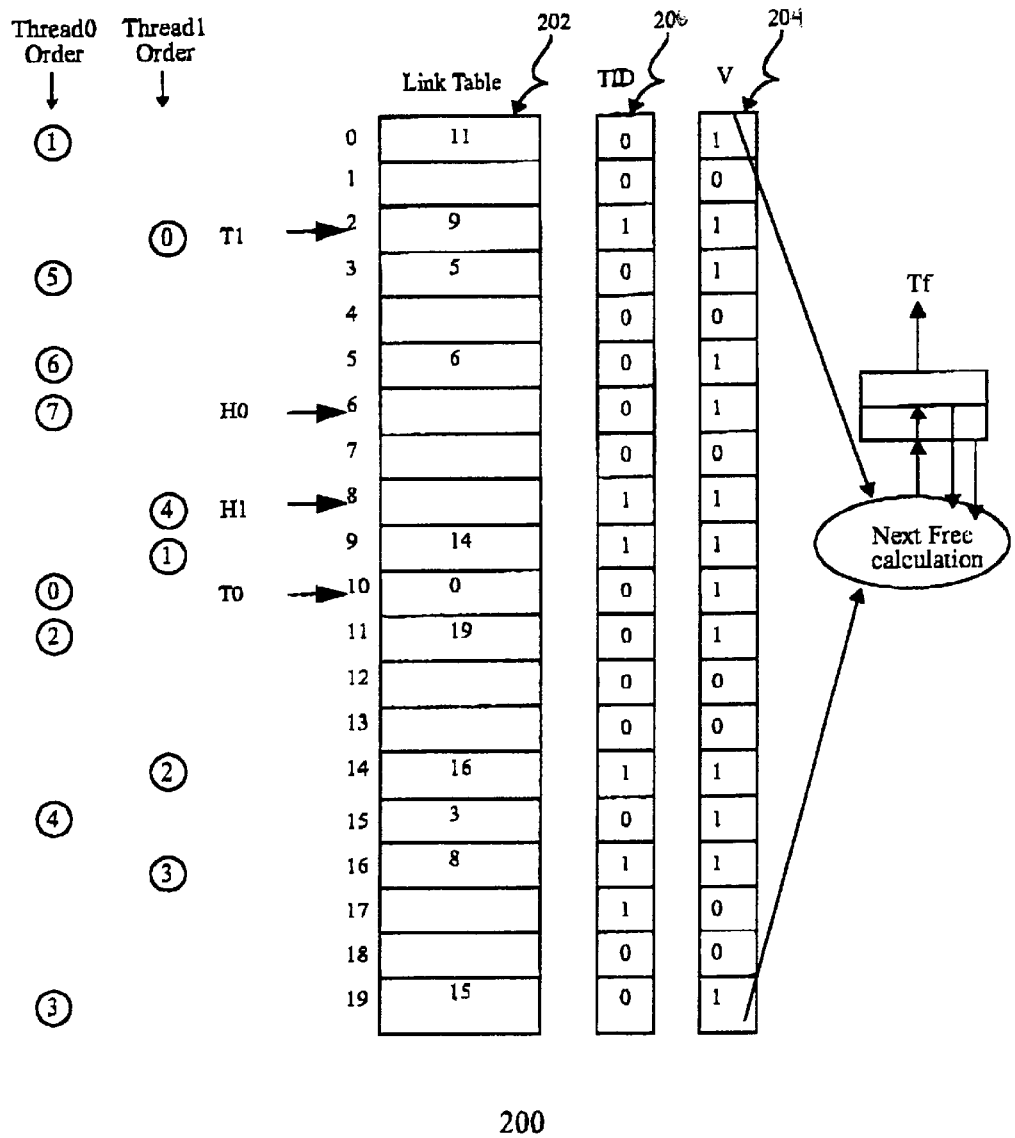
FIG. 3 shows an example of an entry completion table that contains a plurality of groups of instructions.

Accordingly, to overcome the above-identified performance problem, a completion table in a superscalar processor in accordance with the present invention is provided. FIG. 3 illustrates an embodiment of the completion table 200 for two threads in accordance with the present invention. The completion table includes a link table 202, a thread identifier (TID) 206 and a valid bit (V) 204. There is a pair of head and tail pointers for each thread (H0 and T0 for thread0 and H1 and T1 for thread1). The head pointer points to the entry in the completion table 200 that is most recently written to. This entry contains the most recently (youngest) dispatched group of instructions for the corresponding thread. The tail pointer points to the group that is to be completed. This entry contains the least recently (oldest) dispatched group of instructions for the corresponding thread. The head pointer of a thread is updated when a group of instructions in that thread is dispatched. The tail pointer of a thread is updated when a group of instruction in that thread completes. Both head and tail pointers are also updated after a flush.

When a group of instructions is dispatched, a free entry (allocated entry Tf) in GCT 200 is written with the information (not shown) needed to process the group. A link field of the link table 202 of the current entry pointed to by the head pointer is written with allocated entry pointer. This process establishes a link list from which the next sequentially dispatched group can be obtained by reading the data from the link table 202. The link list implementation removes the restriction that the tail may not pass the head. Any empty entry can be allocated thus there is no false indication of full condition as shown in FIGS. 2A–2D, therefore all of the entries of GCT 200 are utilized.

Below are the rules for manipulating dispatch and completion for a 20 entry completion table:
Notation
- Tn Completion table tail pointer of thread n
- Hn Completion table head pointer of thread n
- Tf Free pointer
- [ ] the completion table content of.
  - For example [Tn]=the completion table content of the entry pointed to by the tail of thread n.
- <- - assign to.
  - For example, Tn<- - Tf=set tail of thread n to free pointer value.
- U a location out of valid range (for example 31 for a 20 entry table).

Needed Resource Per Thread
- There is 1 tail (Tn).
  - If Tn is not set by any of the condition then it is held.
- There is 1 head (Hn).
  - If Hn is not set by any of the condition then it is held.
  - There is one thread bit for each completion table entry to indicate which thread the entry belongs to (THD 206).
  - There is one valid bit per entry to indicate if the entry is being used (V 204).

Initial Value
- T0=T1=H0=H1=U
- Thread is empty if Tn=U.

Every Cycle Examine the V Bit 204 and Select an Empty Location (V=0).
- This empty location forms the free pointer Tf.

Adding an Entry at Instruction Dispatch
- If Tn=U (thread n is empty) then Tn<- Tf
- Else [Hn]<- Tf (write link list 202)
- Hn<- Tf Removing an Entry at Completion
- If Tn=Hn and thread n is not being dispatched then Hn<- U (1 going to empty)
- Case
  - (Tn=Hn and thread n is not being dispatched) then Tn<- U (1 going to empty)
  - (Tn=Hn and thread n is being dispatched) then Tn<- Tf (1 going to 1)
  - otherwise Tn<- [Tn]

FIG. 3 shows an example of a 20 entry completion table that contains thirteen (13) groups of instructions, eight (8) from thread0 and five (5) from thread1. The order of dispatch, from oldest to youngest, for thread0 is group 10, 0, 11, 19, 15, 3, 5, 6. As a result the tail pointer of thread0 (T0) points to entry 10. The link field of entry 10 contains 0, the link field of entry 0 contains 11, etc. The head pointer of thread0 (H0) points to entry 6. Since the group from thread0 after entry 6 has not been dispatched, the link field for entry 6 is not valid.

The order of dispatch from oldest to youngest, for thread1 is group 2, 9, 14, 16, 8. A second, independent link list is established for thread1. The order for all valid groups belonging to the same thread in the completion table 200 can be established by traversing the link list. Note that instruction order matters for instructions belonging to the same thread only. Instruction order between instruction belonging to different threads is irrelevant since each thread operates independently from each other.

In a second aspect of the present invention, a method and system for determining the relative order between flushed groups of instructions is provided. When an exception condition such as branch misprediction or interrupt is encountered, all speculative groups of instruction that were dispatched after the instructions that encounter the exception condition need be discarded (flushed). In a superscalar machine, several instructions belonging to several different groups can encounter the exception condition simultaneously. Each execution unit reports the exception condition by sending a GTAG associated with the group that needs to be flushed to a completion function. The completion function must determine the oldest group that needs to be flushed, generate the necessary flush mask, and restore the head pointer of GCT 200 appropriately. The flush mask in a preferred embodiment is a vector of bits which corresponds to the groups that need be discarded. The completion function broadcasts the flush mask to all execution units so that each unit can discard the flushed instructions.

To describe this feature in more detail, refer now to the following example in conjunction with the accompanying figures. The Completion Unit 118 (FIG. 1) generates a flush mask of 20 bits from the GCT 200. The position of each active bit in the flush mask corresponds to the GTAG of the group that needs to be discarded. For example, if bit 3 and 4 of the flush mask are active then any instructions that belong to group (GTAG) 3 or 4 are discarded. The flush mask is thread independent; that is the same flush mask can contain certain active bits specifying groups belonging to different threads.

Figure 4:
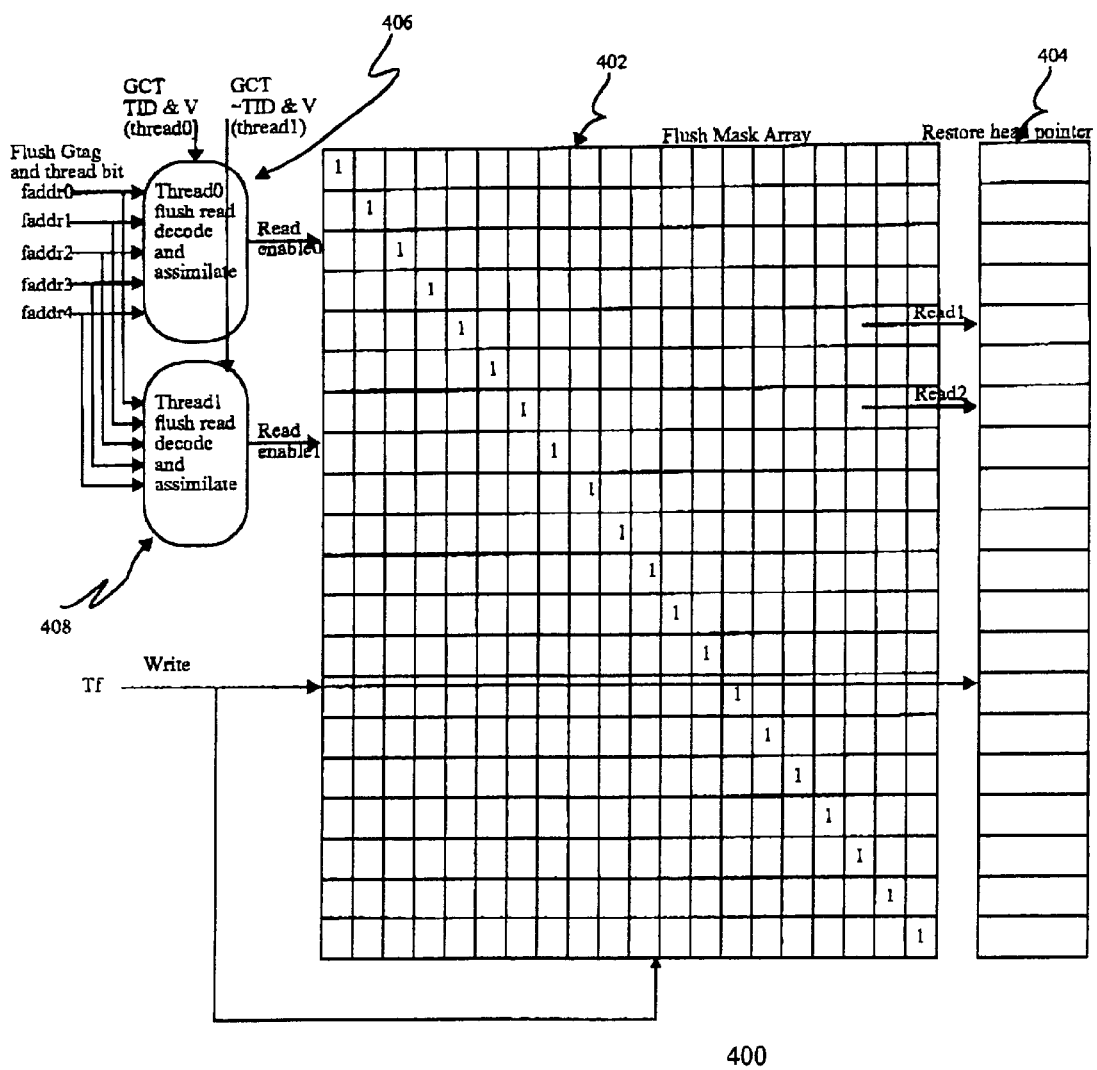
FIG. 4 shows an embodiment of a completion recovery table with 20 entries in accordance with the present invention.

FIG. 4 shows an embodiment of a completion recovery table 400 with 20 entries in accordance with the present invention. Completion recovery table 400 includes the flush mask array 402, restore head pointer table 404, and first and second thread flush, decode and assimilate logic 406 and 408.

When a group of instructions is dispatched, an entry pointed to by the free pointer Tf is allocated in completion table 200 (FIG. 3). At the same time, the corresponding entry pointed to by the free pointer Tf in flush mask array 402 and restore head pointer table 404 are written. Each entry of flush mask array 402 is a vector that indicates which entries of completion table 200 were valid (already exist) at the time this entry is allocated. When examining an entry in flush mask array 402, a 1 (active) indicates that the corresponding entry or GTAG is older than this entry. Correspondingly, a 0 indicates that the corresponding entry is younger than this entry. Thus the relative age of the group of instructions can be determined by examining the flush mask array 402. Each entry of restore head pointer table 404 contains the head pointer at the time this entry is allocated. The restore head pointer table 404 is used to save the current head pointer so that it can be restored if a flush occurs.

There are multiple flush sources. FIG. 4 shows five (5) flush sources feeding flush ports (faddr0–faddr4). Each flush port represents a flush GTAG and a flush thread bit indicator of the group that encounters the exception condition. Multiple flush ports can be active simultaneously. A first thread, flush, decode and assimilate logic 406 decodes all flush GTAG for thread 0, performs a bit by bit OR function on the decoded results and produces a 20 bit read enable1 vector to access flush mask array 402. Likewise, a second thread, flush, decode and assimilate logic 408 decodes all flush GTAG for thread 1, performs a bit by bit OR function on the decoded results and produces a 20 bit read enable2 vector to access flush mask array 402. From the read enable 1 and read enable 2 vectors, flush mask array 402 produces a flush mask that contains active bits associated with groups (GTAG) that are younger than the oldest flushed GTAG and the flush GTAG itself. Flush mask array 402 also produces 2 read pointers that are used to read restore head pointer table 404 to obtain the saved head pointer associated with the oldest flush GTAG for each thread. The saved head pointer points to the youngest entry for each thread after the flush has occurred. The saved head pointer is needed to restore the head pointer of the thread (H0 or H1) after a flush.

Below are the rules for manipulating the writing, reading of flush mask array 402 and restore head table 404 as well as the forming of the flush mask and the restored head pointer. These rules support a 20 entry completion table and 2 threads.

Notation
    Tn Completion table tail pointer of thread n
    Hn Completion table head pointer of thread n
    Tf Free pointer
    [ ] the completion table content of.
        For example [Tn]=the completion table content of the entry pointed to by the tail of thread n.
    <- - assign to.
        For example, Tn<- - Tf=set tail of thread n to free pointer value.
    U—a location out of valid range (for example 31 for a 20 entry table).
    AND=logical and function
    NAND=logical and invert function
    OR=logical or function Needed Resource
    A 20 entry 20 bit flush mask array (i, j) 402 which has:
        1 row write port
        1 column write port
        2 flush read ports (1 per thread)
        The bits at rowi, columni (diagonal) of the array are hardwired to 1
    A 20 entry restore head pointer table 404 which has:
        1 row write port
        2 flush read ports (1 per thread)

Writing the Flush Mask Array 402 at Dispatch
    Tf=allocated pointer=j
    V(0:19)=valid vector 204
    TID(0:19)=thread ID vector 206
    At row j for all bits k that is different than j write V(k).
    This step writes the existing valid vector to the allocated entry except the bit at column j which is hardwired to 1.
    At column j; write 0 to all bits except the bit at row j which is hardwired to 1.

Writing the Restore Head Pointer Table 404 at Dispatch
    Tf=allocated pointer=j
    At row j write Hn (the head pointer of the dispatching thread; either H0 or H1) to restore head pointer table 404

Reading the Flush Mask Array 402 and Forming the Flush Mask
    Flush GTAGs are used to read the flush mask. There are 5 sources: faddr0*faddr4
    These flush GTAG is implemented so that if it is not valid then the pointer is forced to U so that the flush mask array is not read for the inactive (out of range) port.
    For each thread the flush GTAGs are decoded and the results are "OR" bit by bit to form the "read enable" lines to read the contents of flush mask array 402 entries.
    For each thread let A (0:19) be the vector formed by performing the bit by bit NAND of all entries activated by the above read enable lines.
    For each thread let E(0:19) be the vector formed by performing the bit by bit OR of A (0:19) and the read enable lines above. A bit position with a 1 in this vector indicates that the GTAG corresponds to that bit position younger than any GTAGs that are requesting a flush.
    The flush mask for thread0 is formed by performing the bit by bit AND of E(0:19) of thread0 and valid bit V(0:19) 204 and the inversion of thread bit TID (0:19) 206.
    The flush mask for thread1 is formed by performing the bit by bit AND of E (0:19) of thread1 and valid bit V (0:19) 204 and thread bit TID (0:19) 206.
    The flush mask is the bit by bit OR of flush mask for thread0 and flush mask for thread1.

Reading the Restored Head Pointer Table 404 and Restoring the Head Pointer
    The saved head pointer associated with the group (GTAG) that encounters an exception must be restored. This head pointer is saved in restored head pointer table 404 at the location pointed to by the GTAG of the group that encounters the exception. However, since multiple groups can encounter exception conditions simultaneously, the restored head pointer must be associated with the oldest one of groups that encounter exception conditions.
    Per thread: all the flush GTAGs of a thread are decoded and OR bit by bit to form the read enable lines (Read enable 0 for thread0 and Read enable 1 for thread1).
    For each thread let A (0:19) be the vector formed by performing the bit by bit NAND of all entries activated by the above read enable lines.
    For each thread let C (0:19) be the vector formed by performing the bit by bit AND of the bit by bit inversion of A (0:19) and valid bit V (0:19) 204 and the appropriate state of thread bit TID (0:19) 206 (for example the inversion of TID (0:19) 206 for thread0)
    For each thread the restored head pointer table 404 read lines are formed by performing bit by bit AND of C (0:19) with the read enable lines to flush mask array 402. The result read lines is then used to read the head pointer from restored head pointer table 404. This pointer is called Hr.

Hn of the flush thread<- - Hr is the flush does not cause the thread to be empty (all locations have V=0 for that thread).

If a flush causes a thread to be empty.

then force Hn=Tn=U

Figure 5:
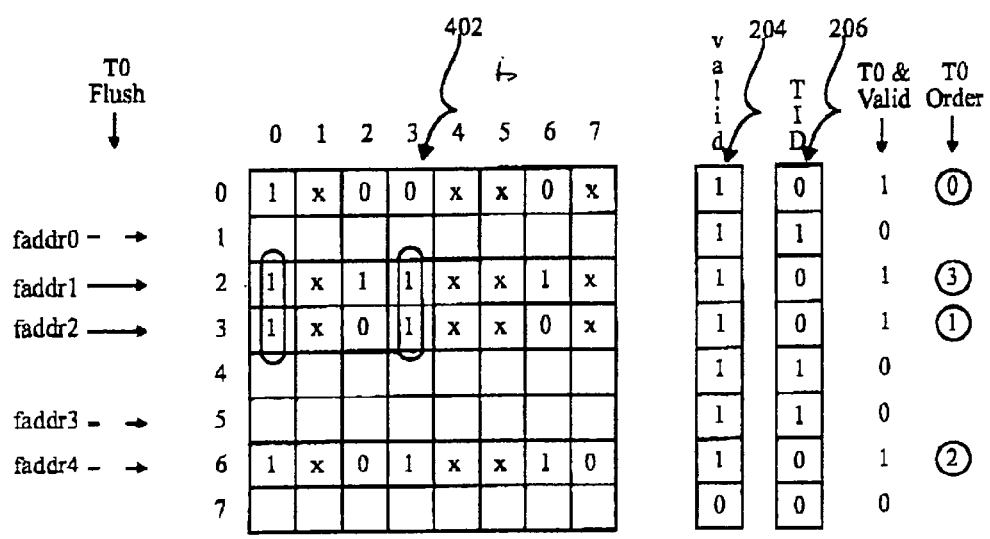
FIG. 5 shows an example of how the flush mask is generated for thread0.

FIG. 5 shows an example of how the flush mask is generated for thread0. For illustrative purpose the top 8 entries (0 to 7) of flush mask array 402 is shown. The remaining entries are not valid and are not shown. Thread0 from oldest to youngest contains GTAG 0, 3, 6, 2; that is GTAG 0 is dispatched first and then GTAG 3, 6, 2 in that order. When GTAG 0 is dispatched row 0 of flush mask array 402 is written with valid vector V (0:19) 204. Bit position 2, 3, 6 of entry 0 which corresponds to GTAGs 2, 3, 6 has values of 0s since GTAGs 2, 3, 6 have not been dispatched. The other positions are of no interest in this example because they are either empty or assigned to thread 1; the value in these locations are marked with "x". All bits except bit 0 in column0 is set to 0. Subsequently when GATG 3 is dispatched, location 3 of flush mask array 402 is written with valid vector V (0:19) 204. Since GTAG 0 has already been dispatched, bit 0 of V (0:19) 204 is 1 thus the content of location 3 of flush mask array 402 has 1s at position 0 and position 3 (hardwired). All bits except the hardwired bit at column 3 of flush mask array 402 are set to 0. Eventually after GTAG 6 is dispatched the state of flush mask array 402 is as shown in FIG. 5.

FIG. 5 also illustrates the case in which there are 2 flush requests being activated at the same time on faddr1 flush port and faddr2 flush port for thread0. GTAG 2 is the flushed GTAG on the faddr1 flush port. GTAG 3 is the flushed GTAG on the faddr2 flush port. Since GTAG 3 is the oldest GTAG of the 2 flushed GTAGs, and GTAG 6 is younger than GTAG 3, GTAGs 3,6,2 should be flushed. The flush mask has 1 in bit positions 2, 3, 6. Referring to flush mask array 402 in FIG. 5, the faddr1 and faddr2 flush ports are decoded, the results are ORed to produce the read enable0 vectors which have bit positions 2 and 3 being active. Entries 2 and 3 of flush mask array 402 are then read and the results are NANDed to form Vector A (0:19). Vector E (0:19) is formed by ORing vector A with the decoded read enable0 vectors (D). The flush mask for thread0 is formed by ANDing vector E with the valid vector V 204 and the inversion of TID 206 (which indicates thread0). Since there is no flush request from thread1 the final flush mask is the same as the thread0 flush mask which indicates GTAG 2, 3, 6 should be flushed.

Figure 6:
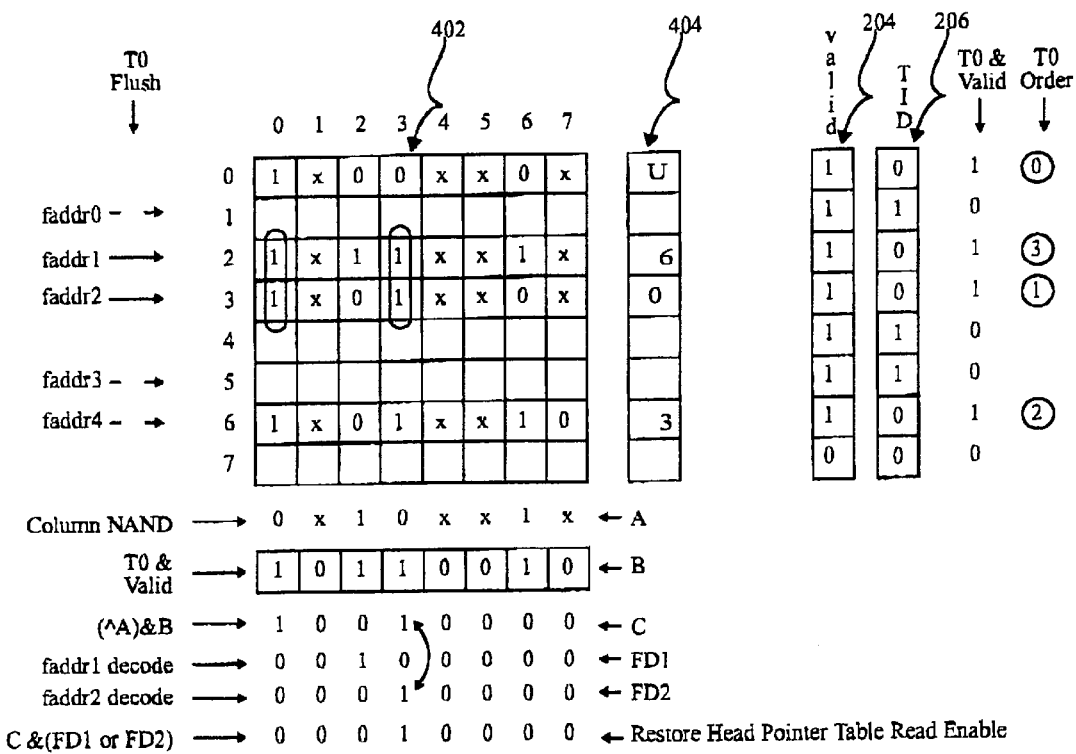
FIG. 6 illustrates how the restore head pointer is obtained for the oldest flush GTAG for the example of FIG. 5.

FIG. 6 illustrates how the restore head pointer is obtained for the oldest flush GTAG for the same example as in FIG. 5. Note that when each group is dispatched the head pointer for that thread is saved in the allocated location in restore head pointer table 404. Thus when group 3 is dispatched the value of 0 which is the head pointer (H0) at that time is saved at location 3 of restore head pointer table 404. Again when the flush requests come in, the A Vector is formed by reading flush mask array 402. The inversion of Vector A is then ANDed with the inversion of TID 206 and V 204 to form Vector C. Vector C is then ANDed with the read enable0 vector (the OR of the 2 decoded flush GTAGs) to form the restore head pointer table read enable. Entry 3 of restore head pointer table 404 is read to obtain the saved head pointer. The value of 0 is read from location 3 and is used to restore the head pointer of thread0 to after the flush. This value is the same value that the head pointer of thread0 (H0) contains before the time group 3 is dispatched.

A method and system for utilizing a completion table in a superscalar processor is disclosed. The method and system comprises providing a plurality of threads to the processor and associating a link list with each of the threads, wherein each entry associated with a thread is linked to a next entry.

In a second aspect a method of determining the relative order between instructions is provided. The determination is necessary when an exception condition occurs in the processor requiring groups of instructions to be flushed that are no longer valid. In this determination, each execution unit reports the exception condition by sending a GTAG associated with the group that needs to be flushed to a completion function. The completion function must then determine the oldest group that needs to be flushed, generate the necessary flush mask, and restore the head pointer of the completion table to the appropriate entry. The flush mask in a preferred embodiment is a vector of bits which corresponds to the groups that need be discarded. The completion function broadcasts the flush mask to all execution units so that each unit can discard the flushed instructions.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for utilizing a completion table in a processor comprising the steps of
    (a) providing a plurality of threads to the processor; and
    (b) associating a link list with each of the threads, wherein each entry associated with a thread is linked to a next entry.

2. The method of claim 1 wherein each entry is linked to next entry via a pointer stored in the associated link list.

3. The method of claim 1 wherein each of the plurality of threads has an associated pair of head and tail pointers, wherein the head pointer points to the most recently dispatched group of instructions for the corresponding thread and the tail pointer points to the least recently dispatched group of instructions for the corresponding thread.

4. The method of claim 3 wherein when a group of instructions is dispatched a free entry is written with the data read to process the group of instructions; and a field within the link table that includes the current entry pointed to by the head pointer is written with the entry to establish the link list.

5. A completion table for use in a processor, the processor receiving at least two threads, the completion table comprising:
    at least two pluralities of entries, each of the at least two pluralities of entries being associated with one of the at least two threads; and
    at least two link lists, each of the at least two link lists being associated with one of the at least two pluralities of entries.

6. The completion table of claim 5 wherein an entry within one of the at least two entries is linked to next entry via a pointer in the associated link list.

7. The completion table of claim 6 wherein the completion table includes a link table, a thread identifier and a valid bit.

8. A method for determining the relative order between flushed groups of instructions utilizing a completion table comprising the steps of:
    reporting an exception condition by at least one execution unit;

determining the oldest group of instructions that needs to be flushed;

generating a flush mask for the groups of instructions that are younger than the oldest group of instructions that need to be flushed; and restoring the head pointer of the completion table based upon the flush mask.

9. The method of claim 8 wherein the position of each bit within the flush mask corresponds to a tag of the group that needs to be discarded.

10. The method of claim 9 wherein the flush mask is thread independent.

11. A table for determining the relative order between flushed groups of instructions in a table comprising:

a flush mask array for indicating which entries of a completion table are valid;

at least one logic means for detecting groups of instructions to be flushed and for accessing the flush mask array based upon the detection; and a restore head pointer table for saving a current head pointer such that the current head pointer can be restored if a flush occurs.

12. The table of claim 11 wherein the relative age of the group of instructions can be determined by the flush mask array.

13. The table of claim 12 wherein the logic means comprises:

a plurality of flush ports; and at least one thread flush, decode, and assimilate logic coupled to the plurality of flush ports.

14. The table of claim 13 wherein the at least one thread flush, decode and assimilate logic decodes all flushed tags for a thread, performs a function on the decoded results and produces a read enable vector to access the flush mask array.

15. The table of claim 14 wherein the flush mask array produces read pointers for the threads that are utilized to read the restore head pointer table.

16. A processing system comprising:

a processor for receiving at least two threads; and a completion table, the completion table further including at least two pluralities of entries, each of the at least two pluralities being associated with one of the at least two threads; and at least two link lists, each of the at least two link lists being associated with one of the at least two pluralities of entries.

17. The processing system of claim 16 wherein an entry within one of the at least two entries is linked to the next entry via a pointer in the associated link list.

18. The processing system of claim 17 wherein the completion table includes a link table, a thread identifier and a valid bit.

19. A processing system comprising:

a processor;

a completion table coupled to the processor; and a flush table for determining the relative order between flushed groups of instructions in the completion table, the flush table further including a flush mask array for indicating which entries of a completion table are valid, at least one logic means for detecting groups of instructions to be flushed and for accessing the flush mask array based upon the detection; and a restore head pointer table for saving a current head pointer such that the current head pointer can be restored if a flush occurs.

20. The processing system of claim 19 wherein the relative age of the group of instructions can be determined by the flush mask array.

21. The processing system of claim 20 wherein the logic means comprises:

a plurality of flush ports; and at least one thread flush, decode, and assimilate logic coupled to the plurality of flush ports.

22. The processing system of claim 21 wherein the at least one thread flush, decode and assimilate logic decodes all flushed tags for a thread, performs a function on the decoded results and produces a read enable vector to access the flush mask array.

23. The processing system of claim 22 wherein the flush mask array produces read pointers for the threads that are utilized to read the restore head pointer table.

* * * * *

UNITED STATES PATENT AND TRADEMARK OFFICE
CERTIFICATE OF CORRECTION

PATENT NO. : 6,721,874 B1
DATED : April 13, 2004
INVENTOR(S) : Hung Qui Le et al.

It is certified that error appears in the above-identified patent and that said Letters Patent is hereby corrected as shown below:

Column 1,
Line 35, after "executed" add -- simultaneously --.

Column 2,
Line 3, after "removed" add -- when --.

Column 8,
Line 27, remove "instruction" and replace with -- instructions --.

Signed and Sealed this

Eleventh Day of January, 2005

JON W. DUDAS
*Director of the United States Patent and Trademark Office*